Figure 1:
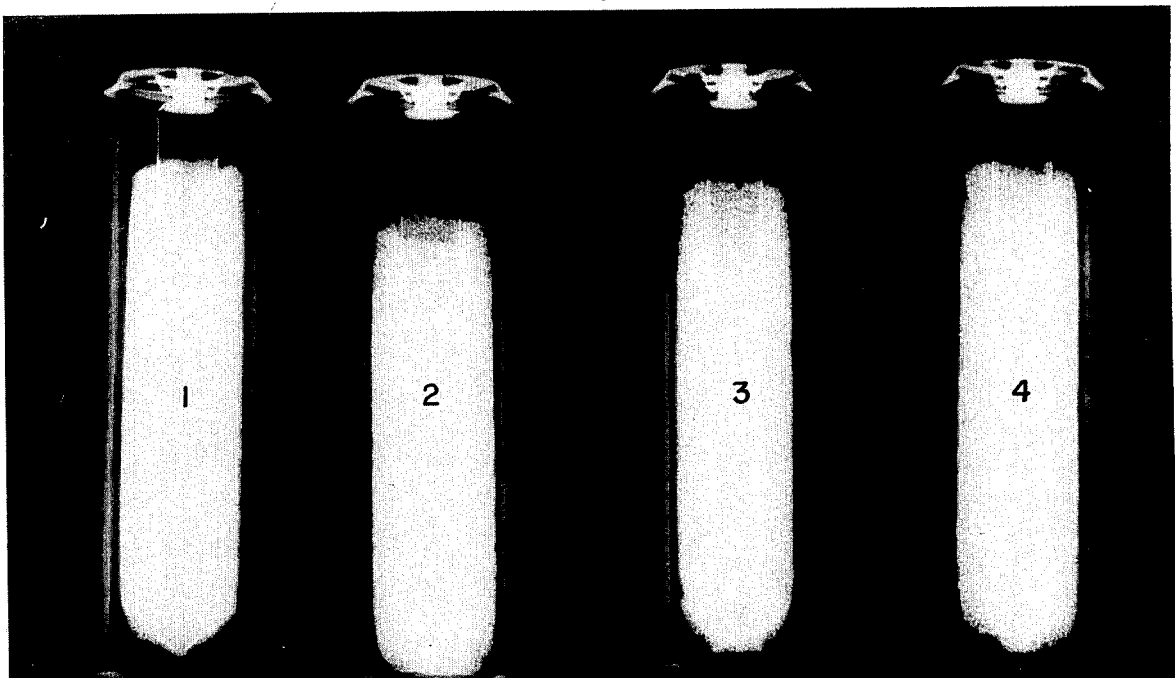

United States Patent
Louzos

[11] 3,905,833
[45] Sept. 16, 1975

[54] CYANIDE AND MERCURY CORROSION INHIBITORS FOR ZINC ALKALINE GALVANIC CELLS

[75] Inventor: Demetrios V. Louzos, Rocky River, Ohio

[73] Assignee: Union Carbide Corporation, New York, N.Y.

[22] Filed: Aug. 8, 1973

[21] Appl. No.: 386,748

[52] U.S. Cl. .............................. 136/107; 136/154
[51] Int. Cl.² ........................................ B08B 3/00
[58] Field of Search ............ 136/154, 30, 106, 107, 136/102

[56] References Cited
UNITED STATES PATENTS

| | | |
|---|---|---|
| 436,602 | 12/1889 | Hollingshead ..................... 136/154 |
| 1,777,202 | 9/1930 | Helbronner ..................... 136/154 X |
| 2,598,226 | 5/1952 | Coleman ............................ 136/102 |
| 2,937,219 | 5/1960 | Minnick et al. .................. 136/154 X |
| 2,991,325 | 7/1961 | Kordisch ......................... 136/106 X |
| 3,281,280 | 10/1966 | Schaefer ......................... 136/154 X |

Primary Examiner—Winston A. Douglas
Assistant Examiner—John F. Niebling
Attorney, Agent, or Firm—C. F. O'Brien

[57] ABSTRACT

A galvanic cell having an aqueous alkaline electrolyte, a zinc anode, a reducible cathode and an inhibiting amount of a cyanide compound which, together with mercury, inhibits the corrosion of the zinc anode and thereby reduces the gassing associated therewith.

6 Claims, 2 Drawing Figures 3,905,833

CYANIDE AND MERCURY CORROSION INHIBITORS FOR ZINC ALKALINE GALVANIC CELLS

FIELD OF THE INVENTION

This invention relates to a method of incorporating a cyanide compound in conjunction with mercury in electrochemical alkaline galvanic cells to inhibit the corrosion of zinc anodes in said cells and to cells containing such cyanide compounds in conjunction with mercury.

BACKGROUND OF THE INVENTION

Galvanic cells utilizing alkaline electrolytes and zinc anodes are susceptible to power loss during storage due to a degree of corrosion of the zinc anodes. This open circuit corrosion of cell anodes results in shortening of shelf life, reduced service capacity and reduced long term cell reliability. Long term cell reliability is reduced because the existence of unequipotential surface areas on the anode results in the growth of long zinc crystals which have a tendency to grow from the face of the negative electrode through the pores of both permeable and semipermeable membranes toward the positive electrode. Upon contact with the positive electrode such zinc crystals, or "trees" as they are known in the electrochemical cell industry, short-circuit the cell so as not only to dissipate the stored electrochemical energy but also to give rise to dangerous heat and gas pressure development.

One solution proposed to lessen the corrosion of zinc electrodes is to saturate or nearly saturate the electrolyte with products of zinc corrosion so as to put the system in a more favorable equilibrium. To accomplish this, zinc oxide or zincate compounds can be added to the electrolyte. It has also been found that the amalgamation of the zinc anode very often aids in the inhibition of non-productive corrosion by the electrolyte. Although these proposals have been partially effective, it is desirable to have alternate materials which will increase the effectiveness of other known corrosion additives in the art such as mercury, zinc oxide and the like.

Another solution proposed is to develop new separator materials or to use thicker or multilayer separators. Unfortunately, thicker separators cause increased internal resistance in the cells.

Another proposal that has been employed with some success to lessen the corrosion of zinc electrodes in cells entails the introduction, in various ways, of mercury, mercury salts and chromate salts in the cells. However, the addition of mercury or mercury salts alone has the following disadvantages:

1. Mercury is insoluble in alkaline electrolytes.
2. Zinc possesses metal impurities having low hydrogen overvoltage, which tend to accumulate on the anode surface of a cell during operation, with the net result that the overvoltage of the amalgam surface is lowered and the corrosion rate increases.
3. The effectiveness of amalgamation is limited by the extent to which air can be excluded from the battery.
4. Since corrosion is a surface reaction, only the mercury present at the anode-electrolyte interface is effective in reducing corrosion.
5. Mercury must be uniformly distributed at the anode surface. Non-uniform amalgamation can arise in many ways in a cell, thus leading to high corrosion rates.
6. It has recently become apparent that the introduction of waste mercury into the environment may be a hazard to human health as well as to other forms of life. While individual cells contain only a small amount of mercury, the very large number of cells marketed today could cause significant quantities of mercury to enter the environment after disposal of such cells.

Chromate inhibitors, on the other hand, often prove unsatisfactory, since they are affected by the presence and nature of cell separators and often lose their effectiveness during operation.

Previous work using various organic compounds as corrosion inhibitors for cells have shown many of them to be unsatisfactory in that they tend to form high resistance anode films or react with other cell components, although wasteful anode corrosion may be low.

It is the primary object of the present invention to provide corrosion inhibitors in conjunction with mercury for alkaline zinc galvanic cells.

A further object of this invention is to provide an alkaline electrolyte for electrochemical cells having an inhibiting amount of a cyanide compound in conjunction with mercury.

It is a further object of the present invention to provide means for extending the shelf life of alkaline zinc galvanic cells.

Figure 2:
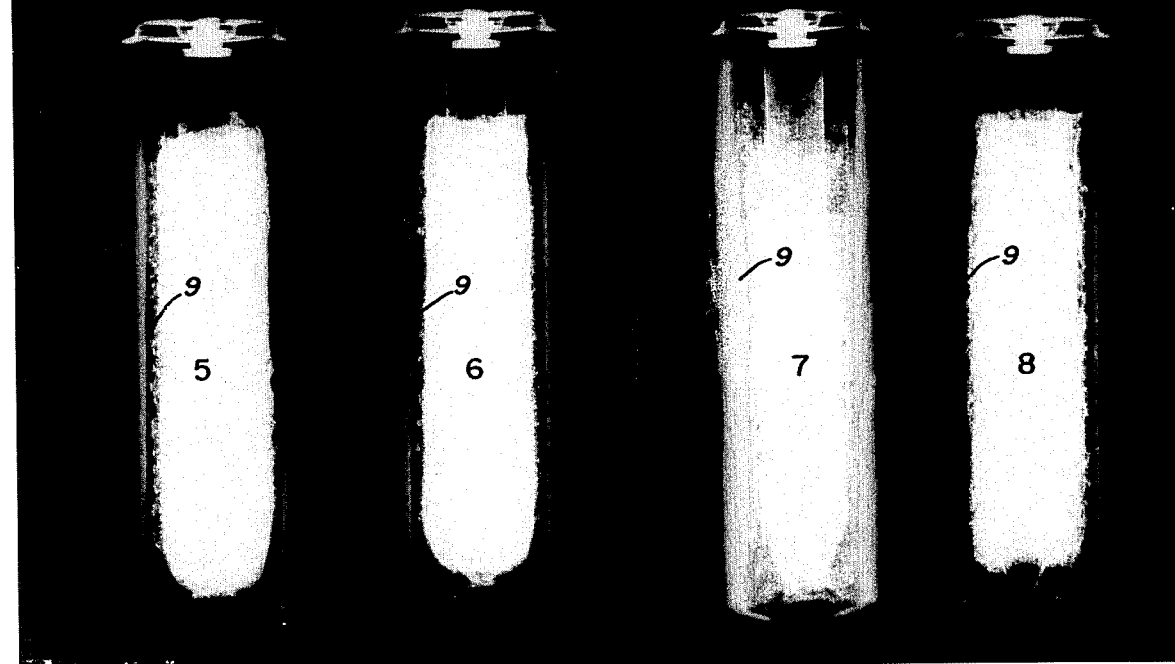

Still other objects will readily present themselves to the skilled artisan upon reference to the ensuing specification, the claims, and the drawing, in which FIG. 1 shows an X-ray taken of four test cells containing a cyanide compound in conjunction with mercury according to this invention, and FIG. 2 shows an X-ray of four test cells of the prior art wherein mercury is used without the cyanide compound.

SUMMARY OF THE INVENTION

The invention relates to a galvanic cell comprising a zinc anode, a reducible cathode, an aqueous alkaline electrolyte and an inhibiting amount of a cyanide compound in conjunction with mercury.

The invention also relates to a method of inhibiting corrosion of a zinc anode in a galvanic cell containing an aqueous alkaline electrolyte and a reducible cathode, which comprises adding an inhibiting amount of a cyanide and mercury compound to said cell.

As used herein, a cell shall mean an individual cell, or one of many cells contained in a battery.

The term "corrosion" refers to non-productive corrosion of a zinc anode which does not produce a usable galvanic current.

In accordance with this invention, the inhibition of the corrosion of a zinc anode in an alkaline galvanic cell is accomplished by the presence of an inhibiting amount of at least one cyanide compound and mercury in the cell. The cyanide compound provides a source of soluble cyanide ions in the electrolyte. This inhibitor does not interfere with the normal operation of a zinc anode in a primary alkaline galvanic cell and yet, in combination with mercury, is effective in inhibiting non-productive corrosion of the zinc, reducing gassing associated therewith and suppressing the formation of zinc crystals during storage.

It is believed that the inherent higher throwing power and more uniform, finer grained deposits obtained from cyanide-containing zincate plating baths result in the cyanide additive serving as a corrosion inhibitor in galvanic cells since it provides an efficient means for attaining a more equipotential zinc surface. Cathodic sites can be formed on the zinc anode surface, e.g., by the deposition of metals less electronegative than zinc arising from heavy metal impurities in the cell. Such a cathodic site in electronic contact with the remainder of the zinc anode results in a corrosion couple in which zinc is anodically dissolved and replated on the cathodic site. This reaction may result in excessive zinc crystal formation and accompanying hydrogen evolution at the cathodic sites. If the crystal growth is not suppressed, it may extend through the separator of the cell, thus creating an internal electronic short. Although we do not wish to be bound by theory, it is believed that the cyanide functions in the cell to form particularly stable metal ion complexes which do not give the same ionic reactions as the heavy metals they contain. Thus, when cyanide compounds are in the presence of mercury, the strong complexing ability of the cyanide ion is believed to result in formation of a soluble $Hg(CN_4)^=$ complex which is believed to act as a reservoir for supplying mercury for uniform amalgamation of the zinc anode. This will result in an equipotential surface on said zinc anode, thereby substantially eliminating the formation of zinc crystals. Furthermore, it can be reasoned that the strong complexing ability of the cyanide ion may prevent heavy metal impurities originating in the cell cathode and elsewhere from forming cathodic gassing sites on the zinc anode. For example, metal ion impurities such as $Fe^{++}$, $Fe^{+++}$ and $Cu^+$ might be expected to be essentially tied up in the very stable complexes, $Fe(CN)_6^{----}$, $Fe(CN)_6^{---}$, $Cu(CN)_4^{---}$ and $Cu(CN)_2^-$, respectively, having instability constants $10^{-35}$, $10^{-42}$, $10^{-32}$ and $10^{-24}$, respectively.

Suitable cyanide compounds for use in this invention include potassium cyanide [KCN], sodium cyanide [NaCN], zinc cyanide [$Zn(CN)_2$], lithium cyanide [LiCN], magnesium cyanide [$Mg(CN)_2$], calcium cyanide [$Ca(CN)_2$], barium cyanide [$Ba(CN)_2$], strontium cyanide [$Sr(CN)_2$] and aluminum cyanide [$Al(CN)_3$]. These cyanides are admirably suited for use in alkaline cells because the cation in each compound is a metal more electronegative than zinc. Thus, the metal cation cannot be chemically displaced from solution by zinc from the anode. The cyanide compound should be employed in an amount which is sufficient to inhibit or substantially prevent the occurrence of non-productive corrosion of the zinc anode and resultant formation of gas.

In general, amounts of the cyanide corrosion inhibitors should be between about 0.01 and about 10 weight percent based on the weight of the electrolyte. An amount of the cyanide corrosion inhibitor below about 0.01 weight percent based on the weight of the electrolyte would be ineffective because there would not be an adequate supply of cyanide ions to form the soluble Hg complex as discussed above. An amount of the cyanide corrosion inhibitor above 10 weight percent based on the weight of the electrolyte would be unsatisfactory because it would reduce the volume available for other cell components in a given cell size and probably would increase the resistivity of cell electrolyte and would not function to further extend the shelf life of the cell. Preferably, the cyanide corrosion inhibitor present in a galvanic cell in an amount between about 0.1 weight percent and about 2.5 weight percent based on the weight of the electrolyte, along with between about 1 and about 8 weight percent of mercury based on the weight of the zinc anode, would be admirably suited for most primary alkaline galvanic cell applications. The actual amount of cyanide inhibitor along with mercury necessary to provide adequate inhibition in any particular cell can easily be determined by methods well known in the art using the teachings of this invention.

The cyanide compound can be incorporated in a cell in several ways. For example, the selected cyanide compound can be added directly to the alkaline electrolyte prior to gelling the electrolyte. An additional method for adding the cyanide compound to a cell would entail preparing a solution containing the compound and then spraying it onto the anode material. Alternatively, a slightly soluble cyanide compound could be blended with a powdered dry gelling agent, e.g., carboxy methyl cellulose, and then mixed with the electrolyte, e.g., KOH solution, and mercury. In any event, a homogeneous distribution of the cyanide compound and mercury about the zinc electrode is desirable to provide uniform protection.

The desired amount of mercury is also added to the alkaline zinc cell to aid in the control of, or to reduce, the undesirable and non-productive reaction between zinc and the alkali electrolyte. One benefit of employing the cyanide corrosion inhibitor of this invention in a cell along with a small amount of mercury is that the combination of the two additives will provide an improved storage stability under comparable conditions for said cell as would be provided in a cell otherwise identical but containing the same quantity of mercury in the absence of said cyanide corrosion inhibitor. Thus, the mercury required for acceptable shelf life using the teachings of this invention can be reduced to below a range of about 1 to 8 weight percent, preferably between about 3 and about 6 weight percent, based on the weight of the zinc anode, such acceptable shelf life depending on such factors as cell construction, raw material impurities, degree of seal effectiveness and the like. Thus the mercury can be added to the cell by any known techniques, such as the procedure described in U.S. Pat. No. 2,993,947, in an amount sufficient to achieve a given level of storage stability.

The aqueous alkaline media that can be employed as the electrolyte for use in galvanic cells utilizing the cyanide corrosion inhibitor of this invention in conjunction with mercury include aqeuous solutions of sodium hydroxide, potassium hydroxide, lithium hydroxide, and the like, and mixtures thereof. The choice of the particular electrolyte material is not narrowly critical, and will depend upon factors such as the type of service intended for the alkaline galvanic cell, the desired conductivity of the electrolyte, and the economics of the intended application. Such factors are well-known to those having ordinary skill in the art. For high rate cells having universal application, an aqueous solution of potassium hydroxide is preferred. As is well-known in the art, the concentration of the alkali metal hydroxide in the aqueous alkaline electrolyte can vary from about 1 to about 12 molar, and preferably from about 6 to 10 molar.

If desired, zinc can be introduced into the electrolyte to form zincate ions so as to further reduce the corrosion rate of the zinc by establishing a more favorable equilibrium, thereby preserving the stability of the zinc. For example, zinc-bearing compounds which are soluble in aqueous alkaline electrolytes include zinc oxide, potassium zincate, and sodium zincate. Zinc oxide is the preferred compound for an alkali metal hydroxide medium because of its low cost, adequate solubility, and also because no extraneous metal ions are introduced into the electrolyte upon dissolution. Thus zincate ions can be formed in an alkaline solution by dissolution of a zinc-bearing compound. Zinc is also introduced into the electrolyte by the anodic dissolution of zinc from the anode material of the cell during discharge. An amount of a zinc compound of between about 0.2 and about 8 weight percent, preferably about 3 weight percent, based on the weight of the electrolyte can be effectively added to most galvanic cells during assembly for the purpose specified above. Although we do not wish to be bound by theory, it is believed that when a zinc-bearing compound is added to the cell, the amount should be sufficient so that, in conjunction with the cyanide compound and mercury, an equilibrium between the ions formed should exist. Thus, the concentration of cyanide complexes along with mercury will influence the amount of zinc-bearing compound required.

The zinc electrode for use in this invention can be massive zinc, it can be zinc plated on another metal, it can be powdered zinc mixed with zinc oxide compressed on a suitable amalgamated metal grid or screen, or it can be a gelled powdered zinc anode. The reducible cathode material can be silver oxide, mercuric oxide, or manganese dioxide.

This invention is further illustrated by the following example:

Thirty-two G-size alkaline-$MnO_2$ cells were fabricated with 2.5 weight percent potassium cyanide added to an alkaline zincate electrolyte containing 35 percent by weight potassium hydroxide, 3 percent by weight zinc oxide, and 8 percent by weight mercury, such weight percents being based on the weight of the electrolyte, except for mercury which was based on the weight of the anode. The zinc anodes for the cells were composed of zinc powder suspended in a carboxy methyl cellulose-KOH gel.

One hundred twenty similar type cells were produced but without the addition of the potassium cyanide.

The two types of G-size alkaline-$MnO_2$ cells were stored for 5 years at a temperature of 72°F (22.2°C). During the 5-year storage period, the average bottom bulges of the cyanide-containing cells and the test control cells were measured. Table 1 shows the comparison in the degree of bottom bulge for the cells during different time periods.

Table 1

| Time in Storage | Bottom bulge in Cyanide-containing Cells (inch) | Bottom bulge in Test Control Cells (inch) |
|---|---|---|
| ½ Year | 0.022 | 0.019 |
| 2½ Years | 0.022 | 0.044 |
| 5 Years | 0.022 | 0.056 |

As shown in the table, the bottom bulge of the cyanide-containing cells remained rather constant while in storage between the time period of ½ year and 5 years. Contrary to this, the bottom bulge of the test control cells increased almost linearly with time during this period. For the full time period of 5 years the average bottom bulge of the cyanide-containing cells measured 0.022 inch (0.056 cm) while the average bulge of the test control cells measured 0.056 inch (0.142 cm). Since bottom bulge is presumably caused by internal gas pressure resulting from corrosion, the bulge data indicated that the cyanide-containing cells had far less internal corrosion and thus good shelf life characteristics.

Four of each type G-size cells were X-rayed using a "Faxitron 804" X-ray unit, made by Field Emission Corporation, a Division of Hewlett-Packard Corporation. The resulting photograph of the four cyanide-containing cells (numbered 1 through 4) is shown in FIG. 1, while the resulting photograph of the four test control cells (numbered 5 through 8) is shown in FIG. 2. As clearly demonstrated by the X-rays of the cells, the growth of zinc crystals during storage was apparent in the test control cells 5 through 8 as compared to their absence in the cyanide-containing cells 1 through 4. In fact, in test control cell 7, the growth of the zinc crystals not only resulted in penetration of the separator but also caused self-discharge of the cell which resulted in the expansion of the cathode material as visually shown. This expansion is characteristic of a discharged cell and, when measured, the open circuit voltage of this cell was found to be only 0.8 volt.

The average open circuit voltages of the cyanide-containing cells and the test control cells were measured and found to be 1.465 volts and 1.470 volts, respectively. One cyanide-containing cell and one test control cell were discharged continuously using 1⅛ ohm load. After 11 hours, the test control cell voltage fell to 0.2 volt, while the cyanide-containing cell exhibited a voltage of 0.9 volt. After 15 hours, the voltage of the cyanide-containing cell decreased to 0.2 volt.

As demonstrated from the above data, the useful productive life of cells utilizing the cyanide and mercury corrosion inhibitors of this invention was greatly increased over the useful productive life of control cells lacking the cyanide corrosion inhibitor. Thus, the teachings of this invention can be employed in both primary and secondary alkaline zinc galvanic cells to prolong the shelf life of said cells.

What is claimed is:

1. A galvanic cell comprising a zinc anode, a reducible cathode, an aqueous alkaline electrolyte, mercury, and at least one cyanide compound in an inhibiting amount selected from the group consisting of potassium cyanide, sodium cyanide, zinc cyanide, lithium cyanide, magnesium cyanide, calcium cyanide, barium cyanide, strontium cyanide, and aluminum cyanide.

2. The galvanic cell in claim 1 wherein the cyanide compound is present in an amount between about 0.01 and about 10 weight percent based on the weight of the electrolyte and wherein the mercury is present in an amount between about 1 and 8 weight percent based on the weight of the zinc.

3. The galvanic cell in claim 2 wherein said cyanide compound is present in said cell in a weight percent between about 0.1 and about 2.5 as based on the weight of the electrolyte.

4. The galvanic cell of claim 1 wherein said aqueous alkaline electrolyte is selected from the group consisting of potassium hydroxide, sodium hydroxide, lithium hydroxide, and mixtures thereof.

5. The galvanic cell of claim 1 wherein the reducible cathode is selected from the group consisting of silver oxide, mercuric oxide, and manganese dioxide.

6. The galvanic cell of claim 1 wherein said electrolyte is potassium hydroxide, said reducible cathode is manganese dioxide and said cyanide compound is potassium cyanide.

* * * * *